Figure 1:
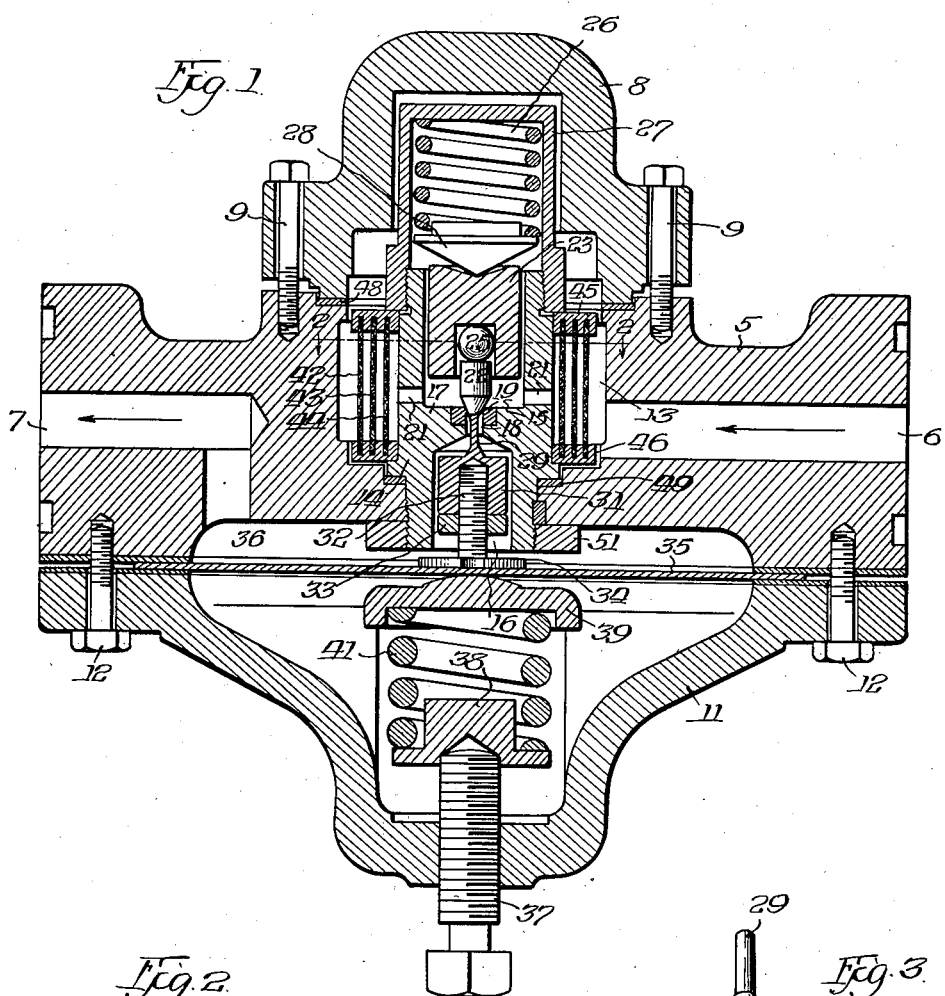

May 26, 1931.  F. E. DENNISON ET AL  1,807,200

EXPANSION VALVE

Original Filed Jan. 29, 1926

Witness:

Inventors
French E. Dennison
Ward S. Ireland
By Ira J. Wilson
Atty

Patented May 26, 1931

1,807,200

UNITED STATES PATENT OFFICE

FRENCH E. DENNISON AND WARD S. IRELAND, OF BELOIT, WISCONSIN, ASSIGNORS TO NATIONAL REFRIGERATION CORPORATION, OF BELOIT, WISCONSIN, A CORPORATION OF DELAWARE

EXPANSION VALVE

Original application filed January 29, 1926, Serial No. 84,573. Divided and this application filed June 18, 1928. Serial No. 286,102.

This invention has been divided pursuant to a requirement of division from copending application Serial No. 84,573, filed January 29, 1926, and relates in general to valves and has more particular reference to expansion valves adapted for use in mechanical refrigerating apparatus.

Prior to our invention considerable difficulty has been encountered in the operation of expansion valves first from the fact that it has been practically impossible to prevent leakage past the valve, particularly after the valve has been in use for some time. This leakage has resulted either from the fact that the valve did not originally accurately fit its seat or from a slight displacement of the valve relatively to its seat while in use, or from minute particles of dirt, grit, sediment or some foreign substance which would become lodged between the valve and its seat so as to prevent accurate and complete seating of the valve, or from the abrasive action of foreign particles against the seat and valve or from wire drawing. In some installations, a slight leakage is not of extreme importance, but in installation requiring low temperature to be held within close minimum and maximum ranges, even a minute leakage materially diminishes the efficiency of the machine.

Another cause of dissatisfaction with existing expansion valves resides in the fact that considerable friction is involved in their operation so that they are not as delicate as they should be and since this friction usually increases with the age of the valves they operate poorly and sometimes even become stuck in closed or more often opened or partially opened position.

One of the primary purposes of our present invention is to provide an expansion valve which will eliminate the wear from abrasive action of foreign particles, will not be subject to the wire drawing and will be highly efficient and wholly accurate in operation so that it may be opened and closed an infinite number of times without sticking and will fully and completely close so as to entirely preclude any leakage.

With this general purpose in view, our invention contemplates improvements in many of the structural features of an expansion valve including the seat, the valve itself, the mounting of the valve, the guides and other devices which control and actuate the valve.

The improvements and novel features of construction involved in the various elements above mentioned as well as others will be more fully appreciated as the invention becomes better understood by reference to the following description when considered in connection with the accompanying drawings.

Figure 2:
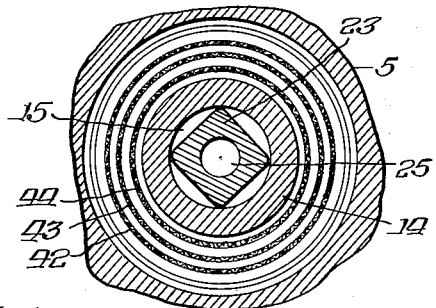
Figure 3:
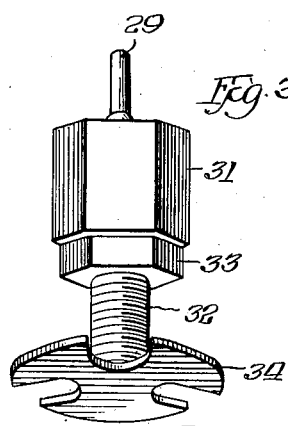

Referring to the drawings:

Fig. 1 is a vertical sectional view through an expansion valve embodying our invention, Fig. 2 is a fragmentary sectional view on the line 2—2 of Fig. 1, and Fig. 3 is a detailed perspective view of the valve lifting or unseating device.

Referring to the drawings more in detail, the valve casing comprises generally the body 5 provided with the inlet passage 6 adapted to be connected to the liquid supply line, the outlet passage 7 adapted to be connected to the expansion coils, the cap or bonnet 8 secured to the body by bolts 9, and the bottom 11 secured to the body by bolts 12.

An annular chamber 13 is formed in the body and within this chamber is disposed a cylindrical member 14 provided at its upper end with a central bore 15 and at its lower end with a central bore 16. These bores are separated by a partial wall 17 provided with a central passage 18 and shaped to accomodate a valve seat 19, the structure and function of which will be later described more fully. Radially disposed ports 21 establish communication between the chamber 13 and the upper central bore 15, through a filter to be later described.

The valve seat 19 is formed of a suitable alloy possessing sufficient rigidity so that it will not flow or become distorted under the normal pressure of the valve against the seat but at the same time being sufficiently soft so that it will conform to the valve itself when the valve, which is of hard metal, or a similarly shaped hardened hob, is forced against the seat under very high pressure. It will be observed that the valve proper 22 has a tapered seating portion and when this portion or a similarly shaped portion of a hob is forced under high pressure against the seat, the seat will be pressed to shape so as to snugly and tightly fit the valve thus providing a better and more satisfactory fit than could be produced by grinding the seat or lapping the seat and valve together and not only is a tighter and more leak-proof fit assured but the expense of production as compared with grinding or lapping both the valve and seat which are customary, is very low.

The seat, in addition to its characteristic of rigidity against deformation under ordinary working pressure of the valve and its capability of conforming to the shape of the valve under high pressure, is sufficiently soft so that particles of grit, dirt, sediment or the like which may become deposited on the seat notwithstanding the fine mesh filter which will be later explained, will not hold the valve away from its seat and thereby permit leakage but will under the pressure of the valve become imbedded in the surrounding seat itself so that notwithstanding the presence of these foreign particles, the valve will close fully and snugly against its seat.

The seat is fitted and secured so snugly in the recess in the partition wall 17 that any leakage around the seat is precluded.

While the seat is preferably formed of an alloy possessing the characteristics above mentioned, an alloy of approximately 27 parts tin and one part silver, such as disclosed in Patent No. 1,626,038, being admirably suitable for the purpose, and the valve proper 22 is preferably of extremely hard material such as tungsten, a reversal, that is a hard seat and a soft valve is contemplated within the purview of our invention.

In order to obviate any danger of the valve getting off-center with respect to the seat, and for the purpose of insuring that the valve will always be self-centering, the valve is loosely mounted in its guide so that it may, in effect, be said to float. With this end in view, the guide 23 is provided with a valve receiving bore 24, slightly larger in diameter than the valve proper 22, thus affording a loose fit, and the upper end of the valve proper has substantially a point contact against a hardened ball 25 or other curved member. The very small contact area between the ball and the valve facilitates the lateral movements of the valve, thus enabling it to automatically center itself and accurately contact with its seat.

The valve is normally urged toward its seat by an expansion spring 26 interposed between the outer end of a cap 27 threaded onto the cylindrical member 14 and an equalizing member 28 resting upon the top of the guide 23. For the purpose of obviating friction which would result from any lateral or diagonal pressure applied to the guide 23, the member 27 has a tapered bottom to provide substantially a point contact with the guide 23, thereby enabling the equalizing member 28 to tilt and accommodate itself to the position and shape of the spring and impart only a direct downward thrust to the guide which has no tendency to cause it to bind against the side walls of the bore 15 and thereby cause a jumpy or irregular opening and closing of the valve. With the view of further reducing to a minimum the friction between the guide 23 and the surrounding walls of the bore 15, the guide is made polygonal in cross section as will be apparent from an inspection of Fig. 2, so that it has substantially line contacts with the walls of the bore instead of surface contact of considerable area, as would be the case if both the bore and the guide were circular in cross section.

The valve is lifted off from its seat against the force of the spring 26 so as to permit a flow of fluid through the device, by means of a push rod or pin 29 projecting upwardly into engagement with the lower end of the valve 22. This push pin is formed on the upper end of a body 31 which is adjustably threaded upon an upstanding stud 32 and locked in adjusted position by a lock nut 33. The body 31 is also polygonal in shape as will be apparent from Fig. 3 to reduce the friction between its perimeter and the surrounding walls of the bore 16 within which it is disposed. The stud 32 is provided at its lower end with a flat disc-like head 34 which rests loosely upon the upper face of a diaphragm 35 clamped at its margins between the opposed faces of the body 5 and the bottom 11. The chamber 36 above the diaphragm is in constant communication with the outlet passage 7 of the valve and is therefore subjected to variations in pressure in the low pressure side of the refrigerating system. A decrease in pressure below normal in the chamber 36 and consequently upon the upper face of the diaphragm 35 will permit the diaphragm to flex upwardly, thereby lifting the push pin 29 to open the valve and an increase in pressure in this chamber will depress the diaphragm, permitting the valve to be closed against its seat under the influence of the spring 26.

The valve is balanced and adjusted so as to close under the requisite predetermined pressure by means of an adjusting screw 37, threaded through the wall of the bottom 11 and carrying a head 38 between which and a cap 39 is interposed an expansion spring 41. It will be obvious that the spring 41, being opposed to the spring 26, adjustment of the spring 41 will serve to regulate the opening and closing movements of the valve with a fine degree of nicety to any pressures which it may be desirable to maintain in the low side of the system.

In the annular chamber 13, through which all fluid must pass from the inlet passage 6 to the valve proper through the radial ports 21, we have mounted a filter screen, which is clearly shown in Figs. 1 and 2. This screen is cylindrical in shape and comprises a plurality, in the present instance, three cylindrical screens designated respectively by reference characters 42, 43, and 44. These screens are made of fine mesh wire cloth. The meshes are preferably of progressively increasing fineness, that is, screen 42 is the coarsest and screen 44 the finest. The upper and lower margins of these screens are imbedded in and sealed by upper and lower metallic rings 45 and 46. The structure of the filter itself and the method of making the same forms the subject matter of a copending application, Serial No. 84,574, filed January 29, 1926. The filter is snugly clamped between the lower end of the cap 27 and an annular shoulder formed on the perimeter of the central member 14. A gasket 48 prevents leakage from the casing above the screen. Leakage around the screen at the bottom is precluded by a gasket 49 interposed between opposed shoulders on the center member 14 and the body 5, the gasket being compressed between these shoulders by a nut 51 threaded onto the lower end of the member 14 as shown in Fig. 1.

It will be apparent therefore that the valve proper is sealed against the entrance thereto of any fluid or solid whatsoever, except such as may pass through the filter, and this filter is so designed and constructed that only the minutest particles of solid matter of such small size that they are practically invisible to the naked eye can pass. Should these extremely small particles become lodged upon the seat of the valve, the structure of the seat is such that if the particle is not crushed between the opening faces of the seat and the valve proper when the valve is forced against the seat it will be forced into and imbedded in the seat itself, which is, as previously explained, sufficiently soft to permit minutest particles which are too hard to be crushed to be forced into the metal of the seat, so that the valve in every instance will snugly engage its seat with a leak-tight fit. It should also be manifest that the valve is so constructed that friction between the moving parts is reduced to a minimum, and any danger of faulty operation as the result of friction is obviated.

The operation of our invention should be apparent without further description, and while we have shown and described a preferred embodiment of the invention, the structural details which we have shown and described may be varied without departing from the essence of the invention nor from the scope of the following claims.

We claim:

1. In a valve, the combination of a casing provided with a valve seat, a circular bore extending upwardly from said seat, a polygonal valve guide slidably disposed in said bore and provided at its lower end with a socket, a ball disposed in said socket, and a valve projecting into said socket and engaging said ball, said guide through said ball being adapted to force said valve against its seat.

2. In a valve, the combination of a casing provided with a valve seat, a circular bore extending from said seat, a valve guide slidably disposed in said bore, a valve proper loosely fitted in said guide for limited lateral movement therein, a thrust ball interposed between the guide and the valve, a spring for exerting pressure upon the valve through the guide, and a pivotally mounted equalizing member interposed between said spring and said guide.

3. In a valve, the combination of a body, a center member projecting upwardly in said body, a valve seat carried by said center member, a guide slidably disposed in said center member above the seat, a valve connected with said seat, a loose connection including a ball in said guide, a cap threaded onto the end of said center member, an equalizing member pivotally disposed upon the upper end of said guide, and an expansion spring interposed between said equalizing member and the upper end of said cap.

4. In a valve, the combination of a seat, a valve guide, a valve loosely fitted in said guide for reciprocal movements and for limited transverse bodily movements therein, and a thrust member having substantially a point thrust contact with said valve so as to permit the valve to move transversely and center itself when urged against said seat by said member.

5. In a valve, the combination of a valve body provided with a center bore, a valve seat at one end of said bore, a valve guide reciprocable in the other end of said bore, a valve proper loosely fitted in said guide for limited transverse bodily movements therein, and a thrust ball interposed between said valve and said guide, the contacting surface of said valve with said ball being a plane surface.

6. In a valve, the combination of a seat, a valve guide with a valve loosely mounted in said guide for reciprocal movements and for limited transverse bodily movements, and a thrust ball in contact with a plane surface of said valve, means for exerting a pressure upon said ball whereby pressure is transmitted through said ball to said valve towards its seat and means for exerting a pressure upon the other end of said valve to urge it away from said seat and into said guide.

In witness of the foregoing we affix our signatures.

FRENCH E. DENNISON.
WARD S. IRELAND.